(12) United States Patent
Karacali-Akyamac et al.

(10) Patent No.: US 12,301,465 B2
(45) Date of Patent: May 13, 2025

(54) ALLOCATING NETWORK ELEMENTS TO SLICES OF NODES IN A NETWORK

(71) Applicant: INTERNATIONAL BUSINESS MACHINES CORPORATION, Armonk, NY (US)

(72) Inventors: Bengi Karacali-Akyamac, Bridgewater, NJ (US); Md Abdul Alim, White Plains, NY (US); Ali Sydney, Pepperell, MA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 18/313,174

(22) Filed: May 5, 2023

(65) Prior Publication Data

US 2024/0372814 A1    Nov. 7, 2024

(51) Int. Cl.
*H04L 47/2441* (2022.01)
*H04L 49/25* (2022.01)

(52) U.S. Cl.
CPC ......... *H04L 47/2441* (2013.01); *H04L 49/25* (2013.01)

(58) Field of Classification Search
CPC ...... H04L 47/2441; H04L 49/25; H04L 49/20
See application file for complete search history.

(56) References Cited

U.S. PATENT DOCUMENTS 10,506,489 B2 * 12/2019 Vrzic .................. H04W 36/26
10,873,476 B2 * 12/2020 Kini ..................... H04L 49/253
10,945,103 B2 * 3/2021 Shaw .................. H04L 41/0896
10,979,955 B2 * 4/2021 Vrzic .................... H04W 36/26
11,595,232 B1 * 2/2023 Chang ................. H04L 12/4633
2015/0110488 A1 * 4/2015 Schlansker ........ H04Q 11/0062
370/254

(Continued)

OTHER PUBLICATIONS

A. Andreyev, "Introducing data center fabric, the next-generation Facebook data center network", Data Center Engineering Networking & Traffic Production Engineering, Nov. 2014, 10 pp., [online] [retriieved Mar. 23, 2023], https://engineering.fb.com/2014/11/14/production-engineering/introducing-data-center-fabric-the-next-generation-facebook-data-center-network/.

(Continued)

*Primary Examiner* — Chris Parry
*Assistant Examiner* — Hassan A Khan
(74) *Attorney, Agent, or Firm* — Konrad, Raynes, Davda & Victor LLP; David W. Victor

(57) ABSTRACT

Provided are a computer program product, system, and method for allocating network elements to slices of nodes in a network. Dedicated network elements are allocated to slices, defining sets of computational nodes, to provide dedicated paths in the network for the computational nodes in the slices to interconnect with other computational nodes in a same slice. The computational nodes connect to leaf switches and the leaf switches connect to spine switches. The spine switches interconnect the leaf switches. The dedicated network elements comprise at least one of a switch, an edge of at least one link, a link, and at least one queue of a port for a link. Switch routing rules are provided to at least one switch including the dedicated network elements to route packets from the computational nodes through the dedicated network elements allocated to the slices of the computational nodes.

20 Claims, 8 Drawing Sheets

(56) References Cited

U.S. PATENT DOCUMENTS

| | | | | |
|---|---|---|---|---|
| 2016/0021032 | A1* | 1/2016 | Maier | H04L 49/70 370/401 |
| 2019/0245915 | A1* | 8/2019 | Kommula | H04L 45/24 |
| 2019/0386913 | A1* | 12/2019 | Wei | H04L 47/125 |
| 2020/0007440 | A1* | 1/2020 | Xu | H04L 45/38 |
| 2020/0067823 | A1* | 2/2020 | Malhotra | H04L 63/0272 |
| 2020/0099589 | A1* | 3/2020 | Sethi | H04L 41/0895 |
| 2020/0221346 | A1* | 7/2020 | Park | H04L 41/342 |
| 2020/0344089 | A1* | 10/2020 | Motwani | H04L 12/4641 |
| 2021/0044503 | A1* | 2/2021 | Zhang | H04L 41/5025 |
| 2021/0266253 | A1* | 8/2021 | He | H04L 49/70 |
| 2021/0288921 | A1* | 9/2021 | Levy | H04L 49/1515 |
| 2021/0314278 | A1* | 10/2021 | Yamaguchi | H04L 41/0893 |
| 2021/0320820 | A1* | 10/2021 | Ruan | H04L 49/602 |
| 2022/0014451 | A1* | 1/2022 | Naik | H04L 45/02 |
| 2022/0075673 | A1* | 3/2022 | Malhotra | H04L 12/2881 |
| 2022/0174042 | A1* | 6/2022 | Cometto | H04L 12/4641 |
| 2022/0191303 | A1* | 6/2022 | Gupta | H04L 67/61 |
| 2022/0209993 | A1* | 6/2022 | Shilimkar | H04L 67/565 |
| 2022/0210058 | A1* | 6/2022 | Bataineh | H04L 45/46 |
| 2022/0210225 | A1* | 6/2022 | Shilimkar | H04L 12/4633 |
| 2023/0006889 | A1* | 1/2023 | Thyagaturu | H04L 41/5054 |
| 2023/0140532 | A1* | 5/2023 | Estevez | H04W 4/60 370/235 |
| 2024/0039792 | A1* | 2/2024 | Berzin | H04W 48/18 |
| 2024/0160496 | A1* | 5/2024 | Brar | H04L 41/12 |
| 2024/0235984 | A1* | 7/2024 | Chunduri | H04L 45/302 |

OTHER PUBLICATIONS

A. Chatzieleftheriou, et al., "Larry: Practical Network Reconfigurability in the Data Center," 15th USENIX symposium on network systems design and implementation, 2018, 17 pp.

Kumar, et al. "Bwe: Flexible, Hierarchical Bandwidth Allocation for WAN Distributed Computing," ACM, SIGCOMM '15: Proc. of the 2015 conference on Special Interest Group on Data Communication, 2015, 14 pp.

Tang, et al., "Slicing-Based Reliable Resource Orchestration for Secure Software-Defined Edge-Cloud Computing Systems", IEEE Internet of Things Journal, vol. 9, No. 4, Feb. 15, 2022, 12 pp.

Shieh, et al., "Sharing the Data Center Network," in 8th USENIX Symposium on Networked Systems Design and Implementation (NSDI 11), 2011, 14 pp.

C. Y. Hong, et al., "Achieving High Utilization with Software-Driven WAN," in SIGCOMM '13: Proc. of the ACM SIGCOMM 2013 conference on SIGCOMM, 2013, 12 pp.

D. Gibson, et al., "Aquila: A unified, low-latency fabric for datacenter networks," 19th USENIX symposium on networked systems design and implementation, 2022, 19 pp.

Rosen, et al., "Multiprotocol Label Switching Architecture", Network Working Group, Jan. 2001, p. 61, [online] [retrieved Mar. 23, 2023] https://datatracker.ietf.org/doc/html/rfc3031.

G. Faanes, et al., "Cray Cascade: A scalable HPC System based on a Dragonfly Nnetwork," IEEE, SC'12: Proc. Of the International conference on higher performance computing, networking, storage, and analysis, 2012, 9 pp.

Yang, et al., "Bandwidth Isolation Guarantee for SDN Virtual Networks," in IEEE Infocom 2021—IEEE Conference on Computer Communications, 2021, 10 pp.

H. Ballani, et al., "Sirius: A flat Datacenter Network with Nanosecond Optical Switching", In SIGCOMM'20: Proc. of the annual conference of the ACM Special Interest Group on data communication on the applications, technologies, architectures and protocols for computer communication, 2020, 16 pp.

"Infiniband Architecture Specification vol. 1 release 1.521,", InfiniBand Trade Association, Nov. 2007, 1727 pp.

"Multi-Tenancy Isolation in Data Center Networks", IP.com, IP.com No. PCOM000212015D, Oct. 25, 2011, 14 pp.

"Bandwidth Management Within Cloud Network Infrastructures", IP.com, IP.com No. PCOM000213419D, Dec. 24, 2011, 6 pp.

"Cooperating Overlay and Underlay Controllers for Cloud Network Traffic Engineering", IP.com, IP.com No. IPCOM000270551D, Jul. 14, 2022, 8 pp.

Jimenez, et al., "Building Express Backbone: Facebook's New Long-haul Network", Data Center Enginering Network & Traffic, May 1, 2017, 7 pp. [online][retrieved Mar. 23, 2023] https://engineering.fb.com/2017/05/01/data-center-engineering/building-express-backbone-facebook-s-new-long-haul-network/.

Martinez, et al., "Network Slicing Resource Allocation and Monitoring Over Multiple Clouds and Networks", Optical Society of America, 2018, 2 pp.

Masoudi, eet al., "Energy-Optimal End-to-End Network Slicing in Cloud-Based Architecture", IEEE Communications Society, Mar. 2022, 19 pp.

Mei, J. et al., "An Intelligence Self-Sustained RAN Slicing Framework for Diverse Service Provisioning in 5G-Beyond and 6G Networks", Intelligent and Converged Networks, 2020, 14 pp.

R. Sherwood et al., "Can the Production Network be the Testbed?," in OSDI'10: Proc. of the 9th USENIX conference on Operating systems design implementation, 2010, 14 pp.

Angel, et al., "End-to-end Performance Isolation Through Virtual Datacenters," 11th USENIX Symposium on Operating Systems Design and Implementation (OSDI 14), 2014, 17pp.

S. Jain, et al., "B4: Experience with a Globally-Deployed Software Defined WAN," in ACM SIGCOMM Computer Communication Review, 2013, 12 pp.

S. Zhang, "An overview of network slicing for 5g," IEEE Wireless Communications, 2019, 7 pp.

* cited by examiner

Edge Information

Slice Information

Traffic Class Switch Routing Rule

Switch Routing Rule
(No QoS Profile)

ALLOCATING NETWORK ELEMENTS TO SLICES OF NODES IN A NETWORK

BACKGROUND OF THE INVENTION

1. Field of the Invention

The present invention relates to a computer program product, system, and method for allocating network elements to slices of nodes in a network.

2. Description of the Related Art

Data center networks are commonly deployed using a Clos topology and are referred to as Leaf/Spine fabrics. Servers on a rack are attached to one or more Top-of-the-Rack (ToR) switches (a.k.a. leaf switches), and each ToR switch is connected to all core switches (a.k.a. spine switches). This topology provides many parallel equal-cost paths between servers across racks. Distributed routing protocols, such as Border Gateway Protocol (BGP), are commonly used in the fabric to compute Equal-Cost Multi-Path (ECMP) routes to forward traffic through the fabric. ECMP hashes on the five tuples of a flow (using source and destination IP addresses, source and destination ports, and protocol ID) to select a path at every hop.

Cloud networks carry traffic from diverse applications over the same infrastructure of switches and routers. These applications typically have diverse requirements from the underlying network. For example, bandwidth-intensive applications require high bi-section bandwidths while latency-sensitive applications require strict traffic isolation and Quality of Service (QOS) support for low latency and jitter.

In a shared infrastructure, one challenge is to provide network customizations given the needs by different applications. One form of customization is to provide dedicated clusters with specialized network technologies to support specialized workloads such as those based on Remote Direct Memory Access (RDMA).

There is a need in the art for improved techniques to allocate dedicated network resources to a set of nodes, such as servers and other systems, to run a specific workload.

SUMMARY

Provided are a computer program product, system, and method for allocating network elements to slices of nodes in a network. Dedicated network elements are allocated to slices, defining sets of computational nodes, to provide dedicated paths in the network for the computational nodes in the slices to interconnect with other computational nodes in a same slice. The computational nodes connect to leaf switches and the leaf switches connect to spine switches. The spine switches interconnect the leaf switches. The dedicated network elements comprise at least one of a switch, an edge of at least one link, a link, and at least one queue of a port for a link. Switch routing rules are provided to at least one switch including the dedicated network elements to route packets from the computational nodes through the dedicated network elements allocated to the slices of the computational nodes. The switch routing rules control the switches to route packets from the computational nodes to the dedicated network elements mapping to the computational nodes in the switch routing rules.

DETAILED DESCRIPTION

To allocate network resources to computational nodes, such as servers and other network devices, described embodiments provide dedicated, custom network slices over a shared network. A network slice refers to a combination of compute resources (such as central processing unit (CPU) and memory) and network resources (such as network paths with certain bandwidths between compute elements). Described embodiments provide a slice-specific network topology that is a subset of the data center network for groups of workloads. Further, switch resources may be split between slices unevenly to accommodate capacity needs of different slices.

Described embodiments may provision on-demand, fully isolated network slices such that a network element (i.e., a switch, a switch port, a TX (transmission) queue of a port, etc.) carries traffic of at most one slice. Further, dedicated slices are provisioned with additional attributes such as bandwidth and Quality of Service (QOS) requirements. Yet further, described embodiments realize fine-grained routing in a data center via a centralized network controller that provides the slice allocations over the switches in the network.

With described embodiments, a slice may host multiple tenants and virtual networks. For example, an RDMA slice can host virtualized networks of tenants that deploy RDMA workloads. Another example is a real-time slice, where tenants may run IP video conferencing applications. Alternatively, cloud providers may provide distinct slices for important customers or customers willing to pay for performance isolation. Described embodiments ensure that the traffic of different slices does not interfere with each other as they traverse physically separate network elements.

Figure 1:
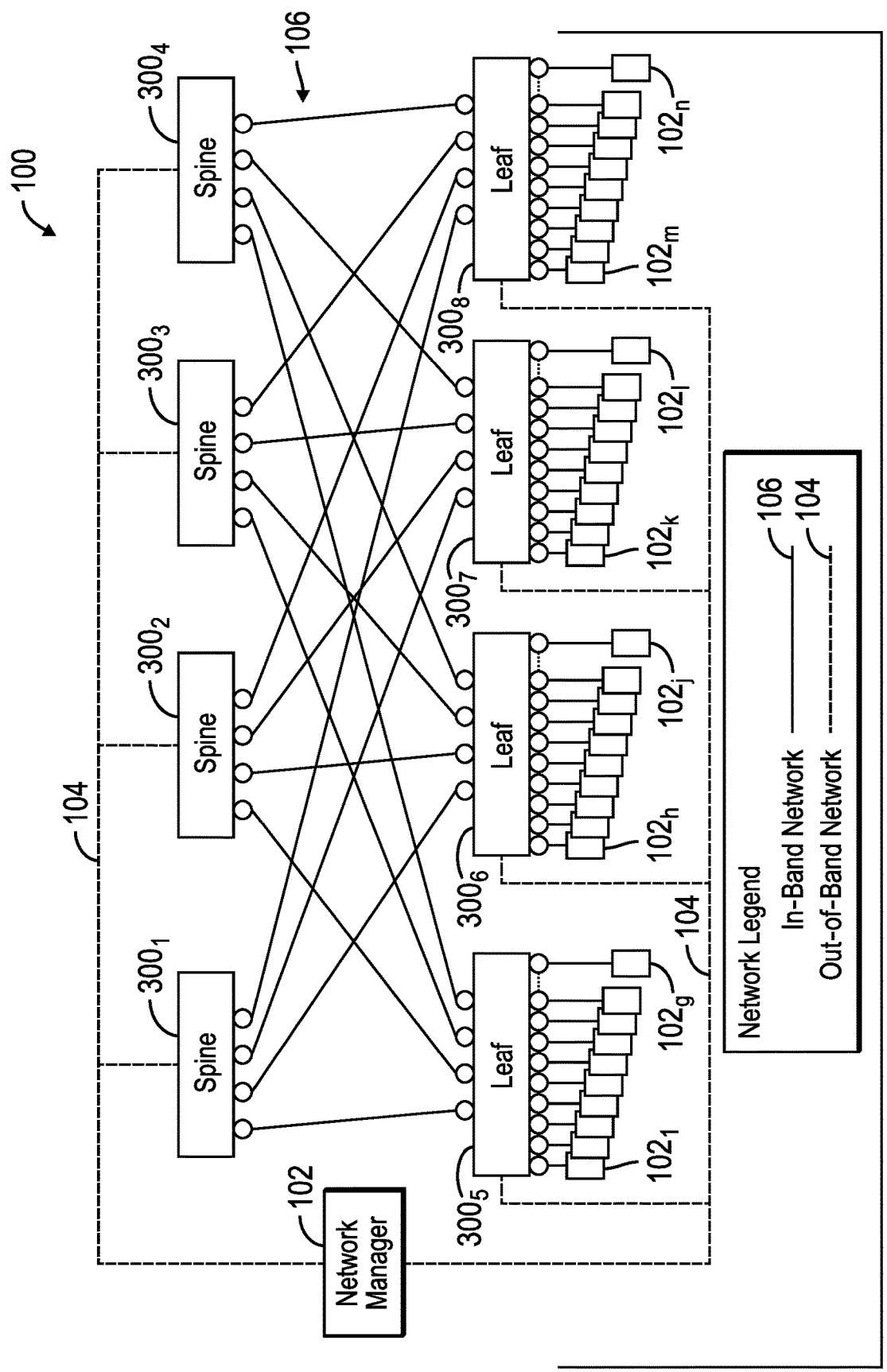
FIG. 1 illustrates an embodiment of a network computing environment.

FIG. 1 illustrates an embodiment of a network computing environment 100 including a network manager 200 that upon initialization determines the topology of all switches $300_1, 300_2 \ldots 300_8$ and computational nodes $102_1 \ldots 102_n$ in the network 100 by communicating with the switches $300_1, 300_2 \ldots 300_8$ over an out-of-band network 104. The network manager 200 may connect to the switches $300_1 \ldots 300_8$ and nodes $102_1 \ldots 102_n$ via an in-band network 106 to configure source routing paths in the switches $300_1 \ldots 300_8$. Alternatively, the network manager 200 may connect to other components using the in-band network 106. The computational nodes $102_1 \ldots 102_n$ may comprise servers, personal computing devices, desktop computers, laptop computers, printers, database servers, and other network computational devices known in the art.

The network manager 200 may assign a unique path identifier (ID) to each disjoint path in the network 100. In certain embodiments, the path ID may comprise a source routing (SR) path ID (e.g., segment routing SID), where the intended path is specified in a packet header. Each of the sets of nodes $102_1 \ldots 102_n$ connect to one or more ports on one or more leaf switches $300_5 \ldots 300_8$. The leaf switches $300_5 \ldots 300_8$ may comprise local switches to connect nodes $102_1 \ldots 102_n$, such as servers, storage servers, or other computational devices, to the network 100. For instance, the leaf switches $300_5 \ldots 300_8$ may comprise Top of Rack (ToR) switches in racks in data center 100. Each set of nodes in a rack, e.g., nodes $102_1 \ldots 102_g, 102_h \ldots 102_j, 102_k \ldots 102_l,$ and $102_m \ldots 102_n$, connects to one or more leaf switches $300_5 \ldots 300_8$. Each leaf switch $300_5 \ldots 300_8$ connects to spine switches $300_1 \ldots 300_4$ to provide connectivity between leaf switches interconnect the leaf switches $300_5 \ldots 300_8$ and nodes $102_1 \ldots 102_n$ connected to the leaf switches $300_5 \ldots 300_8$.

Although a certain number of switches and nodes are shown in FIG. 1, implementations of networks may include any number of nodes and switches, and intermediary levels of switches including multi-state other switches, including multi-stage Clos topologies.

In certain embodiments, the network manager 200 may comprise a Software Defined Network (SDN) underlay controller that manages the underlay network elements (e.g. spine/leaf switches) that are capable of injecting and processing SR paths (e.g. Multiprotocol Label Switching (MPLS) label stacks). In described embodiments, source routing, such as Segment Routing or MPLS, may be used for end-to-end path control.

Figure 2:
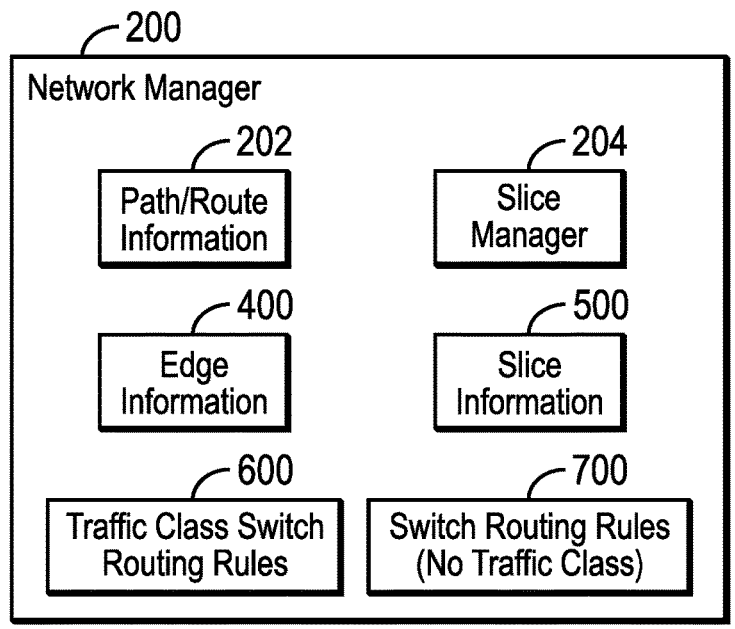
FIG. 2 illustrates an embodiment of a network manager.

FIG. 2 illustrates an embodiment of components included in the network manager 200, including: path information 202 that stores topology of all switches and nodes in the network 100, computes SR paths from each switch $300i$ to all other nodes $102_1 \ldots 102_n$ and switches and stores information about the paths in path information 202, which may be distributed to the switches $300_1 \ldots 300_8$; a slice manager 204 that allocates resources for a tenant requesting an allocation of network resources to use to connect to computational nodes $102_1 \ldots 102_n$; edge information 400 having information on edges between ports on switches $300_1 \ldots 300_8$ and allocation of network elements in switches $300_1 \ldots 300_8$ to traffic classes; slice information 500 having information on slices to which network elements are allocated; and traffic class switch routing rules 600 and switch routing rules without traffic classes 700, on the switches $300_1 \ldots 300_8$ to route packets from computational nodes $102_1 \ldots 102_n$ and other switches $300_1 \ldots 300_8$.

Figure 3:
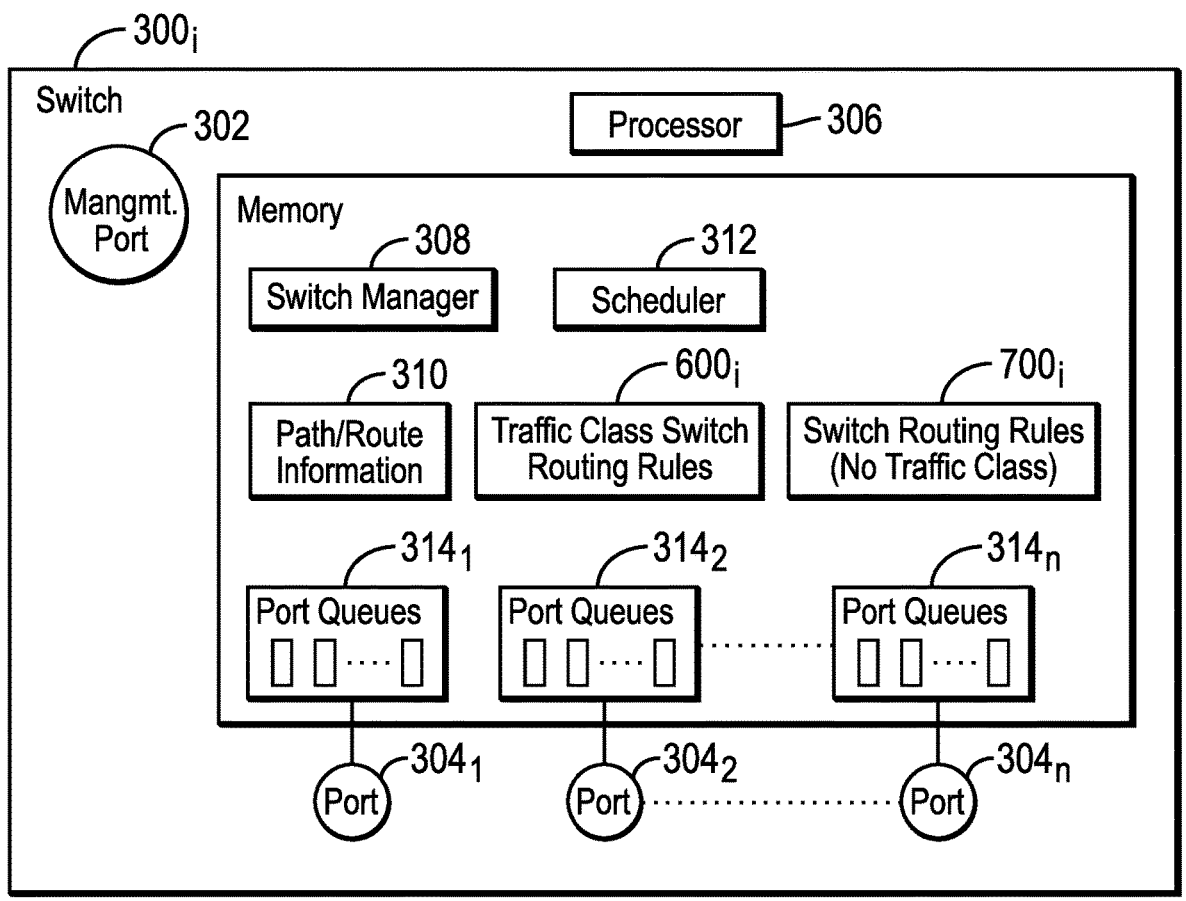
FIG. 3 illustrates an embodiment of a switch in the network.

FIG. 3 illustrates an embodiment of a switch $300_i$ of the switches $300_1 \ldots 300_8$, and includes: a management port 302 to communicate with the network manager 200 over an in-band network 106; ports $304_1 \ldots 304_n$ to communicate with some sub-set of the computational nodes $102_1 \ldots 102_n$ and switches $300_1 \ldots 300_8$; a processor 306; a switch manager 308 executed by the processor 306 to manage switch $300_i$ operations; path information 310 provided by the network manager 200; a scheduler 312 to select a link, port $304_i$ and/or queue $314_i$ for a received packet; traffic class switch routing rules $600_i$ provided by the network manager 200; switch routing rules $700_i$, without traffic classes provided by the network manager 200; and port queues $314_1 \ldots 314_n$ queues in which packets may be queued for the ports $304_1 \ldots 304_n$.

The program components of FIGS. 1, 2, and 3, including program components 204, 308, 312, may comprise program code loaded into a memory and executed by one or more processors. Alternatively, some or all functions may be implemented as microcode or firmware in hardware devices, such as in Application Specific Integrated Circuits (ASICs).

The networks 104 and 106 may comprise a Storage Area Network (SAN), a Local Area Network (LAN), a Wide Area Network (WAN), Clos network, the Internet, and Intranet, peer-to-peer network, direct communication paths, etc.

Figure 4:
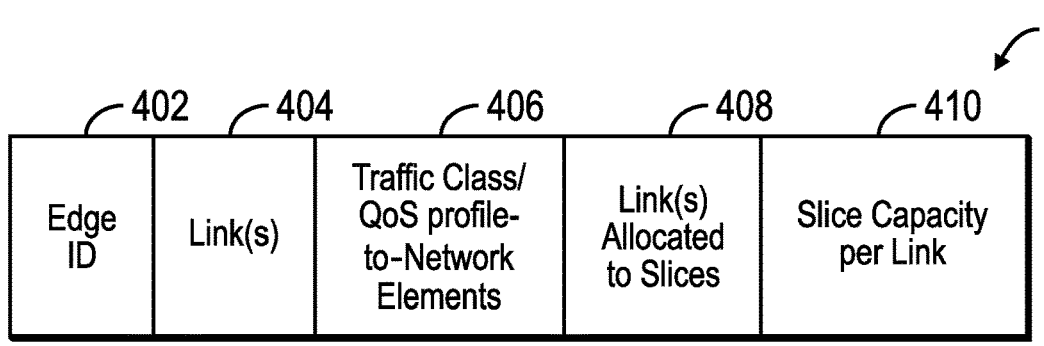
FIG. 4 illustrates an embodiment of edge information.

FIG. 4 illustrates an embodiment of an instance $400_i$ of edge information 400 for edges comprising links, represented as the lines between nodes in FIG. 1, between switch ports $304_i$ of different switches $300_1 \ldots 300_8$, including: an edge identifier (ID) 402; one or more links 404 for the edge 402, where each edge may have one or multiple links between ports connected to the same remote switch $300_j$; a traffic class/Quality of Service (QOS) profile-to-network elements mapping 406, which maps a traffic class to specific network elements in a switch $300_i$, e.g., the entire switch, edges, links, ports, and/or queues in a port, etc.; link(s) allocated to slices 408 for the edge 402; and a slice capacity per link 410, providing bandwidth allocated to each slice, if any, in the link.

The QoS profile definition maps the traffic classes to the queues and the queue resource allocations for the traffic belonging to the slice. The number of queues $314_i$ that can be used by a slice as specified in the QoS profile is subject to the limitations of the port $304_i$. Specifically, if a port has eight queues, the total number of queues used in all slice QoS profiles add up to eight. The hardware limits on the queues depend on the switch vendor and we consider this upper limit when slicing.

Figure 5:
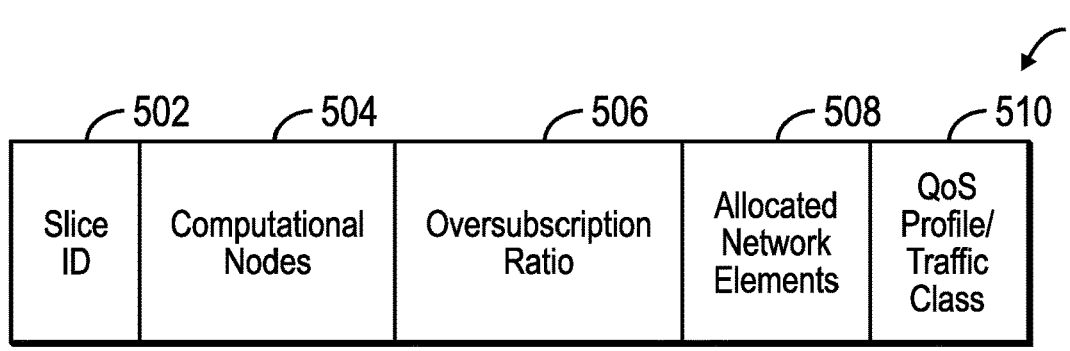
FIG. 5 illustrates an embodiment of slice information.

FIG. 5 illustrates an embodiment of slice information $500_i$ created by the network manager 200 to allocate resources for a slice, and includes: a slice ID 502; computational nodes 504 assigned to the slice 502; an oversubscription ratio 506 specified for the slice 502, that is used to set a ratio of bandwidth capacity for the computational nodes 504 to the bandwidth capacity on the ports connecting to other switches, which may be expressed in gigabit per second (Gbps); allocated network elements 508 allocated to the computational nodes 504 to use; and a QoS profile/traffic class 510 to use for the computational nodes 504. If there is no QoS profile for a slice, then field 510 is empty.

The oversubscription ratio 506 denotes the over subscription ratio requested for the slice, such as by a customer, and is defined as the ratio of total demand from the nodes $102_i$ in the slice to the capacity from the leaf switch $300_1$ to the spine layer, i.e., one or more spine switches $300_S$, allocated to the slice. For example, for a slice that has four nodes, where each node is connected to two distinct leaf switches with a single 100 Gbps link, if each leaf switch is connected to a single spine, where two links from each leaf are allocated to the slice, then the over subscription ratio for the slices is 400 Gbps/200 Gbps, or 2:1, or 2.

Figure 6:
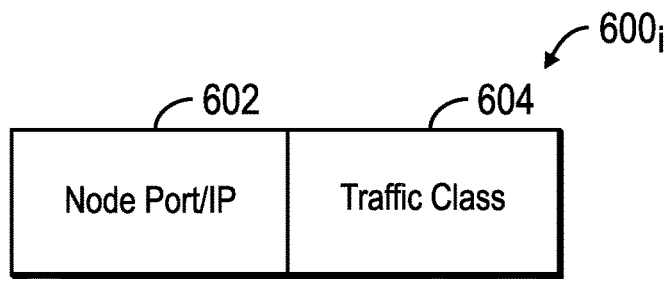
FIG. 6 illustrates an embodiment of a traffic class switch routing rule.

FIG. 6 illustrates an embodiment of an instance of a traffic class switch routing rule $600i$, such as an access control list (ACL) rule, including: a node port/Internet Protocol (IP) address 602 and a traffic class 604 for that node port/IP 602.

Figure 7:
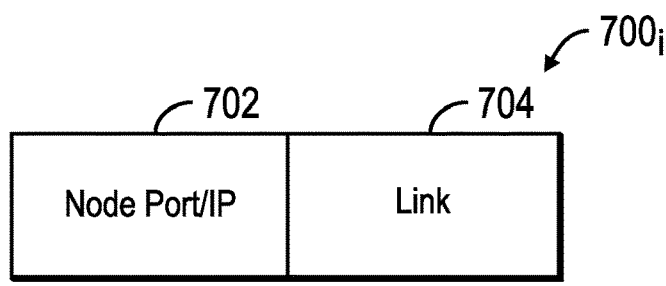
FIG. 7 illustrates an embodiment of a switch routing rule with no Quality of Service (QOS) profile.

FIG. 7 illustrates an embodiment of a switch routing rule, such as an access control list (ACL) rule, including: a node port/Internet Protocol (IP) address 702 and a link 704, edge or switch $300_i$ resource assigned for use by the node port/IP 702.

In certain implementations, a switch 300; may maintain traffic class switch routing rules $600_i$ for certain computational nodes $102_i$ and switch routing rules $700_i$ having no traffic class when no quality of service (QOS) is provided for a computational node $102_i$.

Figure 8:
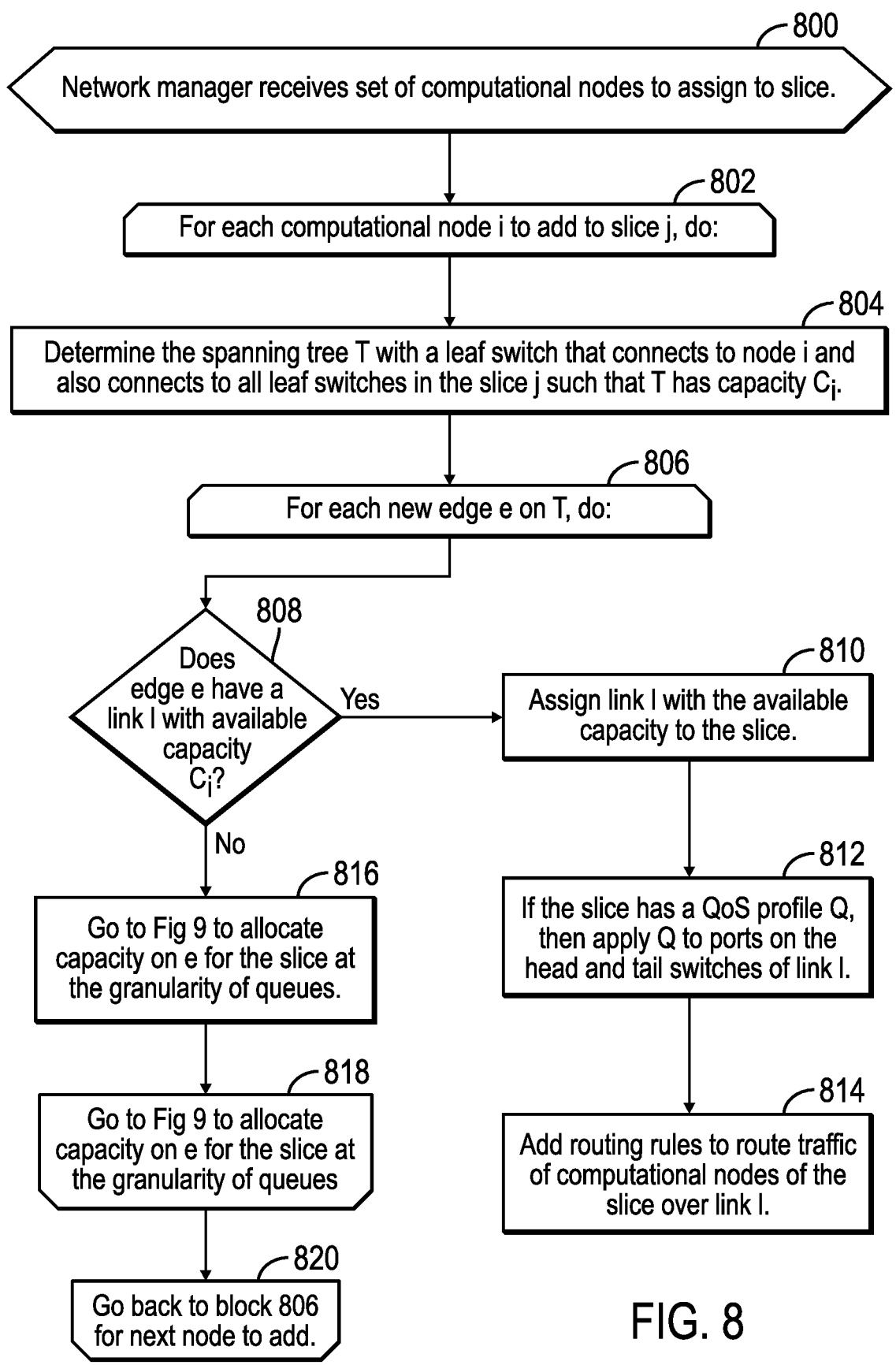
FIG. 8 illustrates an embodiment of operations to assign computational nodes to a slice.

FIG. 8 illustrates an embodiment of operations performed by the slice manager 204 to allocate network elements to computational nodes allocated to slices, where a slice comprises a subset of computational nodes that share a set of network elements, such as switches, edges, links of edges, ports of links, and queues in links. The slice may be created for a customer to use. When the network manager 200 receives a set of computational nodes to assign to slice j, the slice manager 204 performs a loop of operations at blocks 802 through 820 for each computational node $102_i$ to add to slice j. The slice manager 204 determines (at block 804) a spanning tree T of the network 100 nodes with a leaf switch $300_1$ that connects to node $102_i$ and also connects to all leaf switches in the slice j such that T has capacity $C_i$ of the node $102_i$ to add, where the capacity comprises the bandwidth at the port $304_i$ of the computational node $102_i$ connecting to the leaf switch $300_1$. The slice manager 204 configures the new edges added to the subgraph for the slice that are on T. For each such new edge e, a loop of operations is performed at blocks 806 through 818. At block 808, the slice manager 204 checks if edge e has a link l with available capacity $C_i$.

If (at block 808) link l is available, then the slice manager 204 assigns (at block 810) link l to the slice j. If (at block 812) the slice has a QoS profile Q, then the slice manager 204 applies Q to both directions of the link l. A switch routing rule $700_i$ is created (at block 814) to route traffic of computational nodes of the slice. The generated switch routing rules $700_i$ are sent to the switches $300_i$ having the links allocated to the node. The routing rule $700_i$ may indicate network elements other than links, such as an edge or an entire switch.

Figure 9:
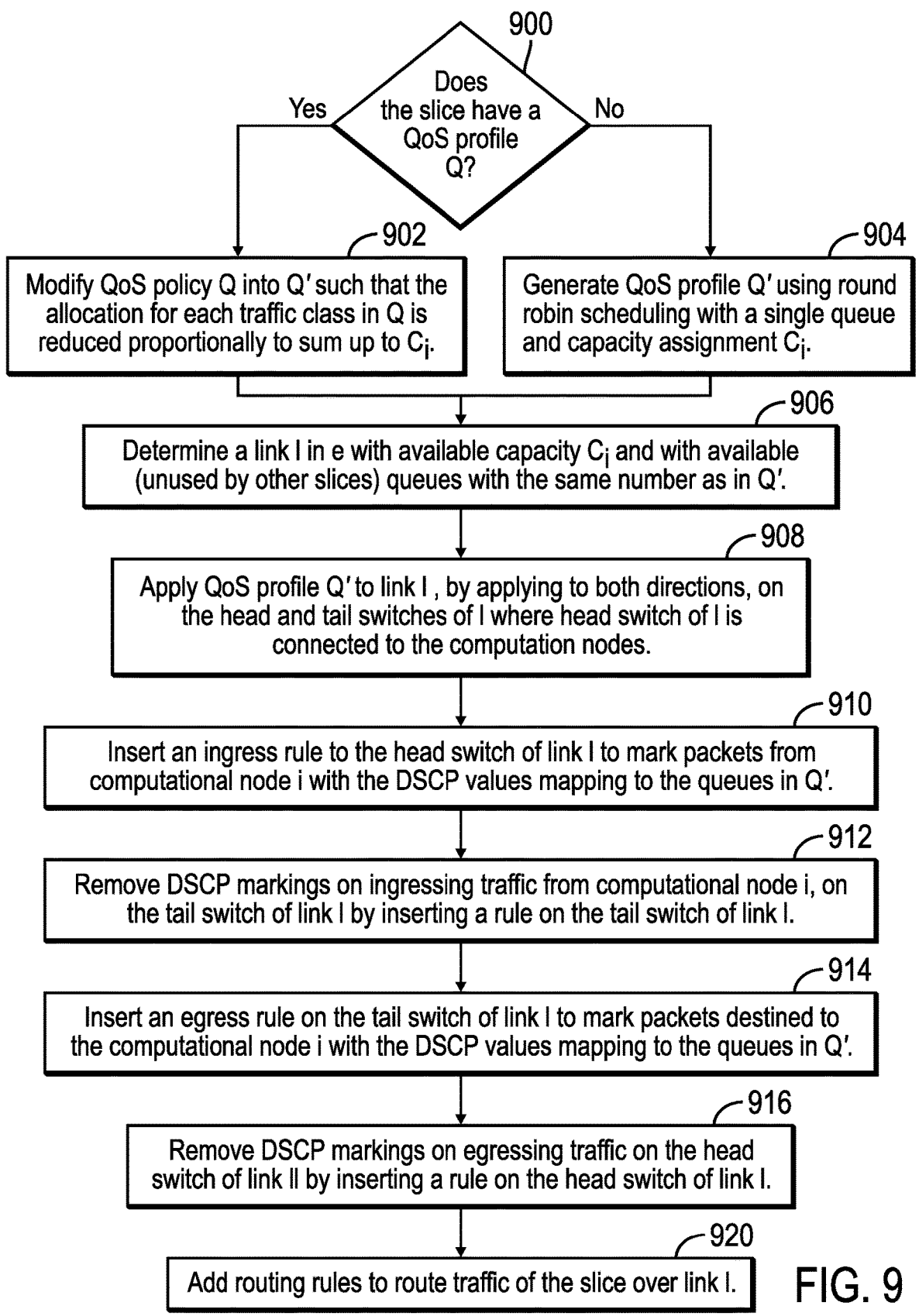
FIG. 9 illustrates an embodiment of operations to allocate edges to a slice having a QoS profile.

If (at block 808) the edge e does not have a link with available capacity $C_i$, then control proceeds (at block 816) to FIG. 9 to allocate capacity on edge e at the granularity of port queues.

With the embodiment of FIG. 8, the slice manager 204 determines edges on a leaf switch $300_1$ to which nodes $102_i$ in a slice connects, and then assigns some level of network elements for the determined edges to the computational nodes $102_i$ to use, such as an entire switch, edge, link or queues of a link. The slice manager 204 may generate switch routing rules 600 or 700 to route packets from the computational nodes $102_i$ to the network elements assigned to the computational nodes $102_i$ to use. The routing rules 600, 700 are then propagated to the switches $300_i$ having the allocated network elements to implement the routing rules 600, 700 for the computational nodes assigned the resources.

In certain embodiments, available capacity of an edge in e is determined by summing the available (i.e., unclaimed for any slice) capacity on each of an edge's parallel links and queues. For example, if an edge has two parallel links and one of them is not assigned to any slice, then the available capacity of the edge is the port line rate. If the port line rate is 100 Gbps, then the edge has 100 Gbps available capacity. If an edge has two parallel links and on each of the links 50% of bandwidth is allocated to different slices, then the edge has available capacity of 2*0.5=1 times the port line rate. If the port line rate is 100 Gbps, then the edge has 100 Gbps available capacity.

Described embodiments may track the total bandwidth demand of all nodes $102_i$ of a slice in a rack that is connected to a leaf switch. This maximum bandwidth demand is allocated evenly between the edges carrying slice traffic. For example, for a rack with a single node $102_i$ of a given slice and let the oversubscription ratio of the slice be one, the maximum bandwidth allocated to the slice is one time the port speed. If there is a single edge carrying the slice traffic, the maximum bandwidth allocated to the slice would be set at port speed. For a rack with two servers of a given slice and the oversubscription ratio 506 for the slice of one, the maximum bandwidth demand of the slice in this rack would be two times the line rate. If one edge is provisioned for this slice, then the maximum allocation of the edge for this slice would be two times the port speed. If two edges carry the slice traffic, then the maximum allocation of each edge would be set to one times the port speed.

With the embodiment of FIG. 8, the network manager 200 has visibility of the network topology and can programmatically update routing and Quality of Service (QOS) settings on a port basis. The network manager 200 also supports dynamic creation/modification/deletion of slices. For example, in a spine/leaf Clos network topology, two full racks of compute nodes can be mapped to a slice by placing all leaf ports connected to the compute nodes in that slice. In this way, all ports on the leaf switches serving the racks of the slice are isolated, i.e., will only carry traffic belonging to the slice. Similarly, all spines ports that connect to the leaf switches serving the two racks will carry traffic belonging to the slice. As a result, traffic sourced/sinked in slices other than the created slice cannot interfere with the traffic of the slice.

FIG. 9 illustrates an embodiment of operations performed by the slice manager 204 to allocate additional network elements to accommodate the addition of computational node $102_i$ to slice j when edge e does not have a link with available capacity $C_i$. Upon invoking the operations of FIG. 9 at block 816 in FIG. 8, the slice manager 204 determines (at block 900) whether the slice j has a QoS profile Q. If so, the QoS policy Q is modified (at block 902) into Q' such that the allocation for each traffic class in Q is reduced proportionally to sum up to $C_i$. If (at block 900) the slice j does not have a QoS profile Q, then the QoS profile Q' is generated (at block 904) using round robin scheduling with a single queue and capacity assignment $C_i$.

From block 902 or 904, the slice manager 204 determines (at block 906) a link l in edge e with available capacity Ci and with available (unused by other slices) queues with the same number as in Q'. The QoS profile Q' is applied (at block 908) to link l, by applying to both directions, on the head and tail switches of l where head switch of l is connected to the computation nodes. An ingress rule is inserted (at block 910) to the head switch of link l to mark packets from computational node i with Differentiated Services Code Point (DSCP) values mapping to the queues in Q'. DSCP values are included in the IP header of packets to classify and manage network traffic and provide a QoS. The DSCP markings on ingressing traffic are removed (at block 912) from computational node i, on the tail switch of link l by inserting a rule on the tail switch of link l. An egress rule is inserted (at block 914) on the tail switch of link l to mark packets destined to the computational node i with the DSCP values mapping to the queues in Q'. DSCP markings are removed (at block 916) on egressing traffic on the head switch of link l by inserting a rule on the head switch of link l. Routing rules $600_i$ are added (at block 920) to route traffic of the slice j over link l.

With the embodiment of FIG. 9, the capacity allocated to edges in a switch for traffic classes is reassigned to capacity needed for a new node to add to a slice to allow nodes assigned to a traffic class to share capacity of an edge, even if the capacity is reduced. Further, updated edge information and traffic class switch routing rules are generated to indicate this new allocation of queues to the traffic classes to use to assign to packets from nodes that communicate with the switch having the edges allocated to the computational nodes of the slice.

Figure 10:
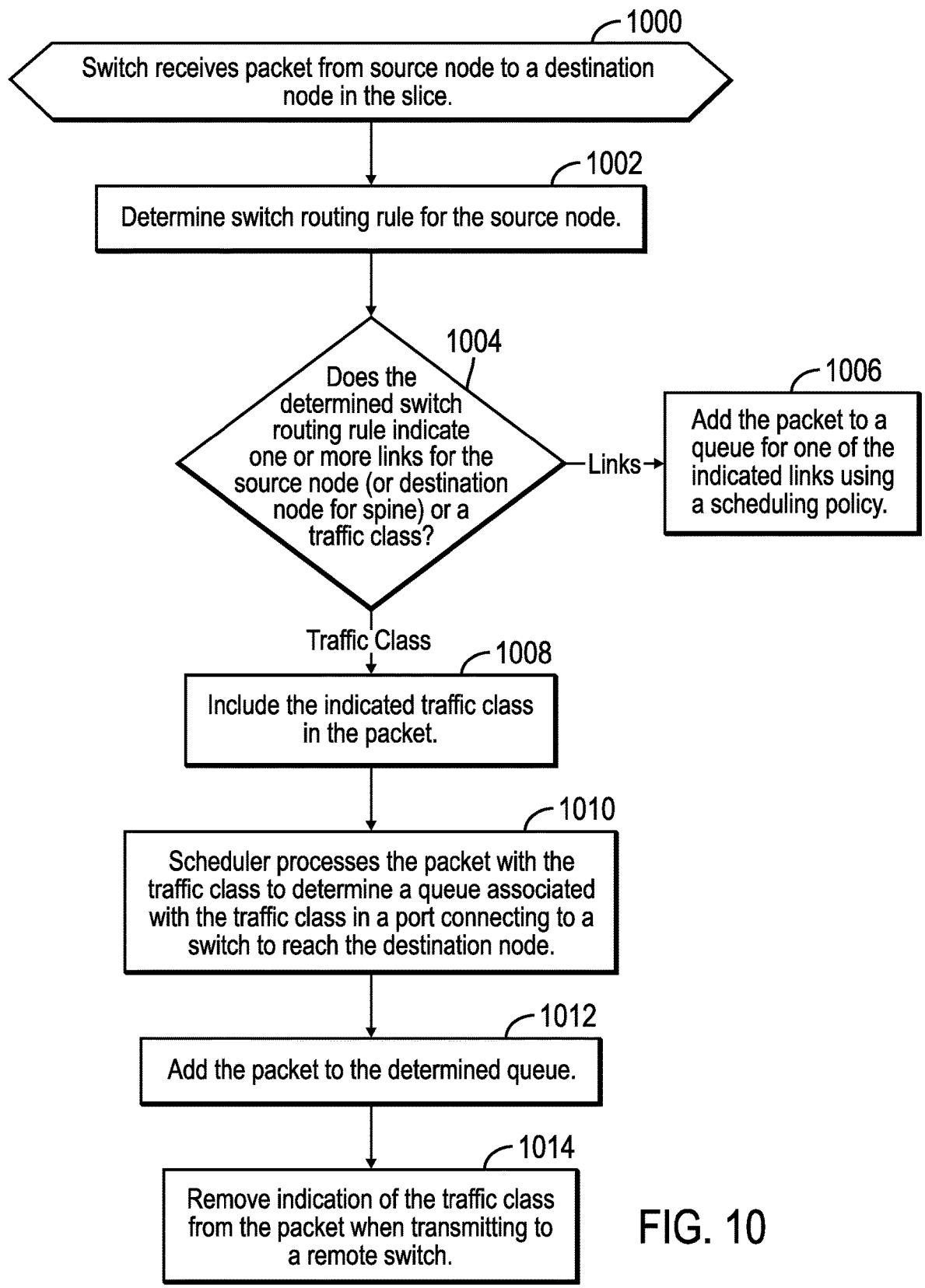
FIG. 10 illustrates an embodiment of operations for a switch to determine network elements to use for a packet received from a source node.

FIG. 10 illustrates an embodiment of operations performed by a switch manager 308 in switches $300_1 \ldots 300_8$ having switch routing rules 600, 700 to route packets from computational nodes $102_1 \ldots 102_n$ along edges between switches and between switches and nodes. Upon a leaf switch $300_1$ receiving a packet from a source node $102_S$ to a destination node $102_D$, a determination is made (at block 1002) of the switch routing rule for the source node $102_S$, or the destination node $102_D$ for a spine switch $300_S$. If (at block 1004) the determined switch routing rule $600_i$ or $700_i$ indicates links for the source node $102_S$ (or destination node for a spine switch $300_S$), then the scheduler 312 in the switch $300_1$ adds (at block 1006) the packet to a queue $314_i$ for one of the indicated links 704 according to a scheduling policy.

If (at block 1004) the switch routing rule indicates a traffic class 604, then the switch manager 308 includes (at block 1008) the indicated traffic class 604 in the packet. The scheduler 312 processes the packet and traffic class to determine (at block 1010) a queue $314_i$ associated with the traffic class in a port $304_i$ connecting to a switch $102_c$ to reach the destination node. The packet is added (at block 1012) to the determined queue $314_i$. The switch manager 308 removes (at block 1014) indication of the traffic class from the packet when transmitting the packet to the connected switch $102_c$.

With the embodiment of FIG. 10, if a traffic class is marked in the packet, then the packet is placed in the queue matching the traffic class marking ensuring physical separation from the traffic of other slices which would traverse different ports or queues.

Figure 11A:
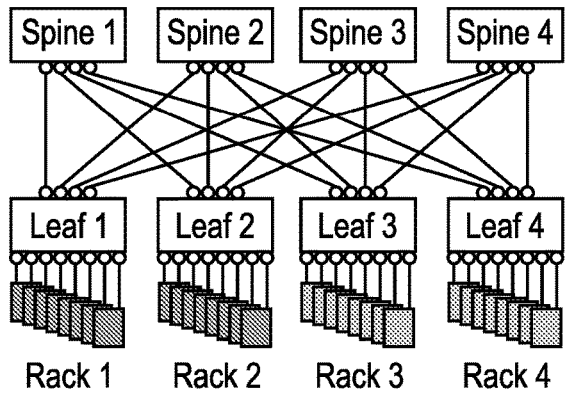
FIGS. 11a, 11b, 12a, 12b, 13, and 14 illustrate examples of assignment of computational nodes and network resources to slices.
Figure 11B:
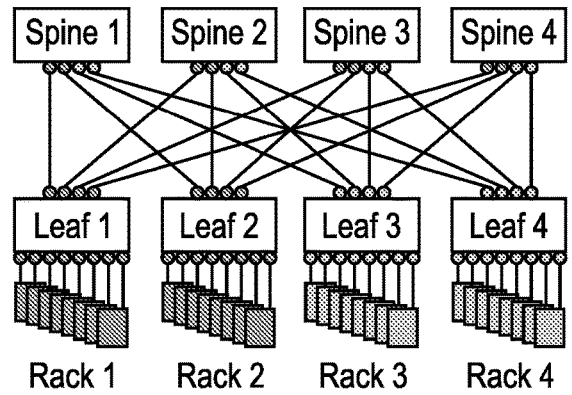

FIG. 11a provides an example allocation for two slices, slice 1 and slice 2, in a spine/leaf Clos network topology, where all nodes on Racks 1 and 2 are assigned to slice 1 and all nodes on Racks 3 and 4 are assigned to slice 2. Legend 1100 shows the mapping of network resources to slices according to shading, which applies to FIGS. 11a, 11b, 12a, 12b, 13, and 14. In this example all ports of leaf switches 1 and 2 belong to slice 1 and those of leaf switches 3 and 4 belong to slice 2. The network subgraph for each slice is shown in FIG. 11b. A port allocated to a slice only carries traffic from nodes allocated to that same splice. In this example each port carries traffic of at most one slice and slices 1 and 2 have the same oversubscription ratio as the original fabric. This provides fully isolated/dedicated slices.

Figure 12A:
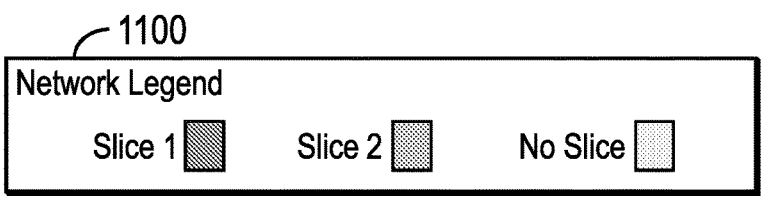
Figure 12A:
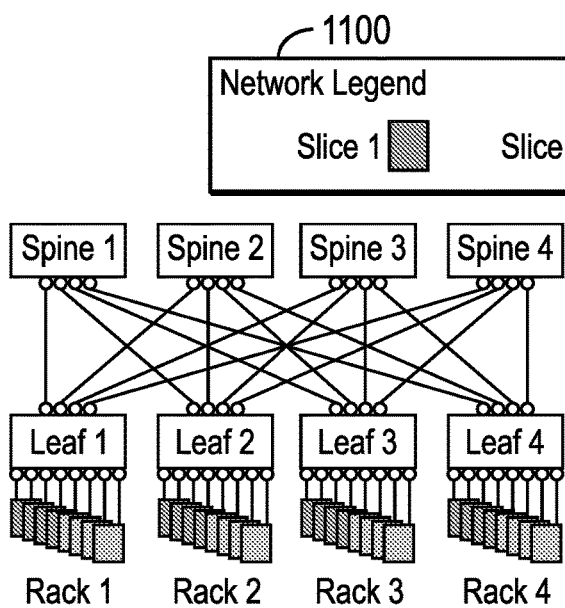
Figure 12B:
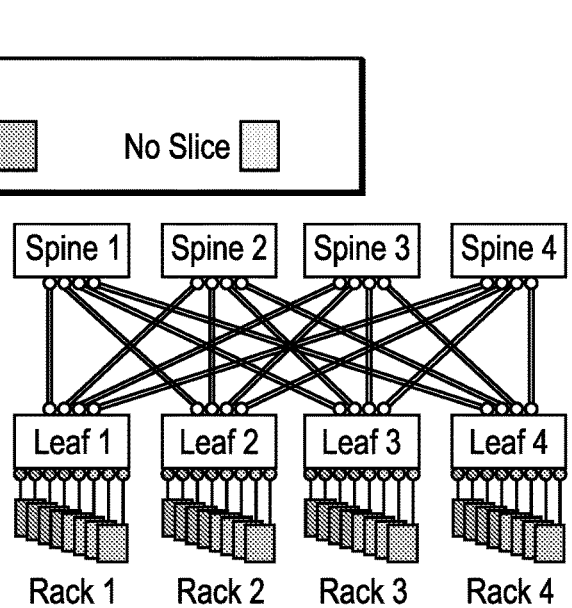

FIG. 12(a) shows an example with another allocation of the red and green slices for the same network shown in FIG. 1, where 50% of servers from each rack are assigned to slice 1 and the other 50% to slice 2. The sub-graphs for each slice are shown in FIG. 12b. In FIG. 12b, all spines connect both slices with at 50% capacity. Specifically, two queues in each port are allocated to distinct slices, i.e., one queue is dedicated to the red slice and the other one to the green. Therefore, each such queue serves at most one slice. In this example, each rack has nodes from at most two slices. The network controller provisions two slices by selecting two output queues locally. QoS rules are configured on the leaf switches to mark slice 1 traffic based on their ports/IPs to a traffic class, for instance Traffic Class 1 (TC1). Similarly, slice 2 traffic can be marked with TC2. On the ports from the leaves to the spines, a QoS rule maps TC1 and TC2 to distinct output queues. This can be achieved by using a round-robin scheduling mechanism to ensure the switch scheduler spends equal time servicing the two queues.

On the spine ports facing the leaf switches, a similar approach is used to isolate slice traffic into distinct queues. In this case, the traffic class assignment uses destination IPs to assign slice 1 destined packets to TC1 and slice 2 destined packets to TC2. In this example, changing the capacity allocation between the slices can be used for giving different oversubscription ratios to the slice. Assuming a 100 Gbps port speed, this network has 2 to 1 (2:1) over-subscription, 800 Gbps traffic demand from the servers on a rack is served by 400 Gbps of capacity from each leaf to a spine. In this example, assigning slice 1, 80%, and slice 2 20% of every queue would give the slice 1 an oversubscription of 1.25 and give slice 2 to an oversubscription of 1.

This slicing approach based on queue assignments can be expanded to support slice specific QoS policies. For example, if a port is shared between slices 1 and 2, such that queue 1 is assigned to slice 1 and queue 2 is assigned to slice 2, each queue receives 50% of the bandwidth. If slice 1 requires support for a new traffic class, another queue, 3, can be employed such that 25% of the bandwidth is allocated to both queue 2 and queue 3. As shown, the percent allocation between different slices is maintained such that the total percentage for a given port is 100%.

Figure 13:
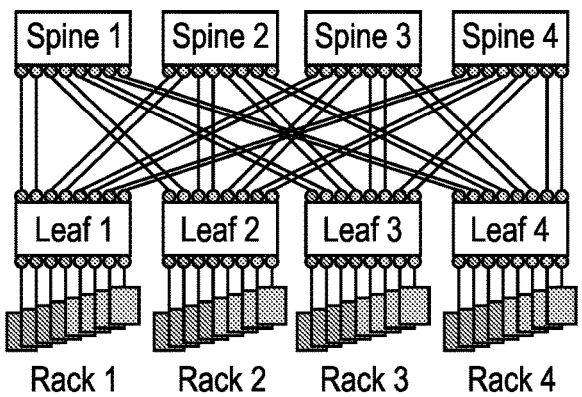

FIG. 13 shows slicing techniques leveraging multiple parallel links between ports between leaf and spine switches. The slicing assigns subsets of the parallel links to slices 1 and 2. In this example, there are two parallel links between a pair of leaf and spine switches and one of each is assigned to a distinct slice. This assignment maintains a 1:1 oversubscription ratio in the data center network.

Figure 14:
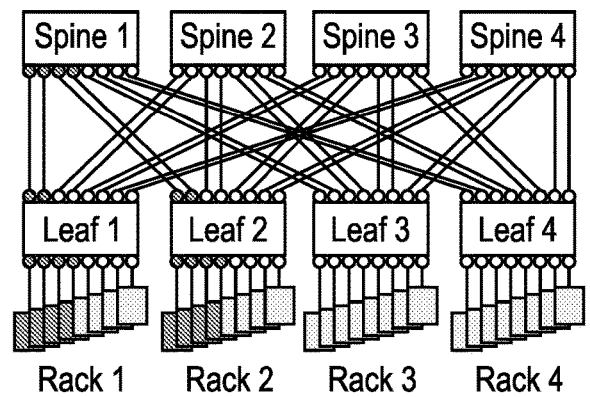

FIG. 14 shows slices having different over-subscription ratios. To create a slice with 50% of servers from two racks and with an oversubscription ratio of 2:1, two spine-facing full links on each leaf switch are allocated. Since there are two parallel links between each leaf and spine pair, a single spine switch is used as shown in FIG. 14.

In an implementation of FIG. 9, described with respect to FIG. 1, starting from a network 100 having no slice-to-allocations, allocating a first node $102_1$ does not require any link provisioning. If a second node $102_2$ is added to the slice, traffic of nodes $102_1$ and $102_2$ would traverse the same leaf switch $300_5$. If a third node $102_h$ connecting to leaf $300_6$ is added to the slice, the full rate is allocated if the oversubscription rate is 1. Adding a fourth node $102_{h+1}$ includes two new links at a full rate, where each of the four nodes has their own link. However, when adding a fifth node $102_k$ to leaf switch $300_7$, two new links from spine switches $300_1$ and $300_2$ to leaf switch $300_7$ are allocated at 50% of the line rate to interconnect switches $300_5$ and $300_6$ to leaf switch $300_7$ in the same slice.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1500 contains an example of an environment for the execution of at least some of the computer code involved in performing the inventive methods, such as the network manager components 1522, including the slice manager 204. In addition to the network manager components 1522, computing environment 1500 includes, for example, computer 1501, wide area network (WAN) 1502, end user device (EUD) 1503, remote server 1504, public cloud 1505, and private cloud 1506. In this embodiment, computer 1501 includes processor set 1510 (including processing circuitry 1520 and cache 1521), communication fabric 1511, volatile memory 1512, persistent storage 1513 (including operating system 1522 and blocks 1522), peripheral device set 1514 (including user interface (UI) device set 1523, storage 1524, and Internet of Things (IoT) sensor set 1525), and network module 1515. Remote server 1504 includes remote database 1530. Public cloud 1505 includes gateway 1540, cloud orchestration module 1541, host physical machine set 1542, virtual machine set 1543, and container set 1544.

The WAN 1502 may be implemented in a data center including the network topology of FIG. 1, including the switches $300_1 \ldots 300_8$.

Figure 15:
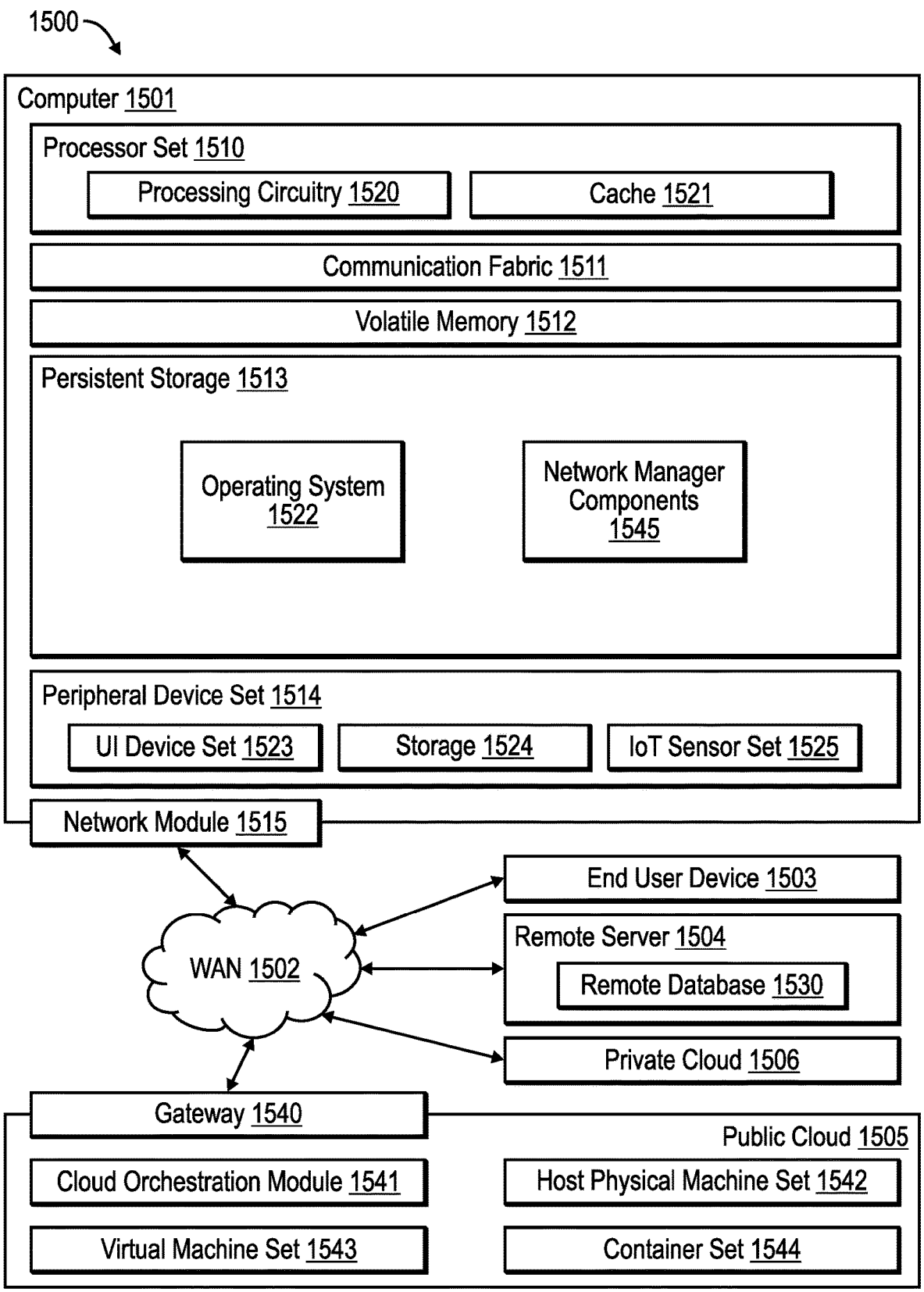
FIG. 15 illustrates a computing environment in which the components of FIGS. 1, 2, and 3 may be implemented.

COMPUTER 1501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1530. As is well understood in the art of computer technology, and depending upon the technology, performance of a computer-implemented method may be distributed among multiple computers and/or between multiple locations. On the other hand, in this presentation of computing environment 1500, detailed discussion is focused on a single computer, specifically computer 1501, to keep the presentation as simple as possible. Computer 1501 may be located in a cloud, even though it is not shown in a cloud in FIG. 15. On the other hand, computer 1501 is not required to be in a cloud except to any extent as may be affirmatively indicated.

PROCESSOR SET 1510 includes one, or more, computer processors of any type now known or to be developed in the future. Processing circuitry 1520 may be distributed over multiple packages, for example, multiple, coordinated integrated circuit chips. Processing circuitry 1520 may implement multiple processor threads and/or multiple processor cores. Cache 1521 is memory that is located in the processor chip package(s) and is typically used for data or code that should be available for rapid access by the threads or cores running on processor set 1510. Cache memories are typically organized into multiple levels depending upon relative proximity to the processing circuitry. Alternatively, some, or all, of the cache for the processor set may be located "off chip." In some computing environments, processor set 1510 may be designed for working with qubits and performing quantum computing.

Computer readable program instructions are typically loaded onto computer 1501 to cause a series of operational steps to be performed by processor set 1510 of computer 1501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1521 and the other storage media discussed below. The program instructions, and associated data, are accessed by processor set 1510 to control and direct performance of the inventive methods. In computing environment 1300, at least some of the instructions for performing the inventive methods may be stored in blocks 302 and 308 in persistent storage 1513.

COMMUNICATION FABRIC 1511 is the signal conduction path that allows the various components of computer 1501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1512 is any type of volatile memory now known or to be developed in the future. Examples include dynamic type random access memory (RAM) or static type RAM. Typically, volatile memory 1512 is characterized by random access, but this is not required unless affirmatively indicated. In computer 1501, the volatile memory 1512 is located in a single package and is internal to computer 1501, but, alternatively or additionally, the volatile memory may be distributed over multiple packages and/or located externally with respect to computer 1501.

PERSISTENT STORAGE 1513 is any form of non-volatile storage for computers that is now known or to be developed in the future. The non-volatility of this storage means that the stored data is maintained regardless of whether power is being supplied to computer 1501 and/or directly to persistent storage 1513. Persistent storage 1513 may be a read only memory (ROM), but typically at least a portion of the persistent storage allows writing of data, deletion of data and re-writing of data. Some familiar forms of persistent storage include magnetic disks and solid state storage devices. Operating system 1522 may take several forms, such as various known proprietary operating systems or open source Portable Operating System Interface-type operating systems that employ a kernel. The network manager components 1545 may include the code in blocks 302 and 308 of FIG. 3, including at least some of the computer code involved in performing the inventive methods.

PERIPHERAL DEVICE SET 1514 includes the set of peripheral devices of computer 1501. Data communication connections between the peripheral devices and the other components of computer 1501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1523 may include components such as a display screen, speaker, microphone, wearable devices (such as goggles and smart watches), keyboard, mouse, printer, touchpad, game controllers, and haptic devices. Storage 1524 is external storage, such as an external hard drive, or insertable storage, such as an SD card. Storage 1524 may be persistent and/or volatile. In some embodiments, storage 1524 may take the form of a quantum computing storage device for storing data in the form of qubits. In embodiments where computer 1501 is required to have a large amount of storage (for example, where computer 1501 locally stores and manages a large database) then this storage may be provided by peripheral storage devices designed for storing very large amounts of data, such as a storage area network (SAN) that is shared by multiple, geographically distributed computers. IoT sensor set 1525 is made up of sensors that can be used in Internet of Things applications. For example, one sensor may be a thermometer and another sensor may be a motion detector.

NETWORK MODULE 155 is the collection of computer software, hardware, and firmware that allows computer 1501 to communicate with other computers through WAN 1502. Network module 1515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1515 are performed on the same physical hardware device. In other embodiments (for example, embodiments that utilize software-defined networking (SDN)), the control functions and the forwarding functions of network module 1515 are performed on physically separate devices, such that the control functions manage several different network hardware devices. Computer readable program instructions for performing the inventive methods can typically be downloaded to computer 1501 from an external computer or external storage device through a network adapter card or network interface included in network module 1515.

WAN 1502 is any wide area network (for example, the internet) capable of communicating computer data over non-local distances by any technology for communicating computer data, now known or to be developed in the future. In some embodiments, the WAN 1502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1503 is any computer system that is used and controlled by an end user (for example, a customer of an enterprise that operates computer 1501), and may take any of the forms discussed above in connection with computer 1501. EUD 1503 typically receives helpful and useful data from the operations of computer 1501. For example, in a hypothetical case where computer 1501 is designed to provide a recommendation to an end user, this recommendation would typically be communicated from network module 1515 of computer 1501 through WAN 1502 to EUD 1503. In this way, EUD 1503 can display, or otherwise present, the recommendation to an end user. In some embodiments, EUD 1503 may be a client device, such as thin client, heavy client, mainframe computer, desktop computer and so on. The EUD 1503 may comprise the computational nodes $102_1 \ldots 102_n$ in FIG. 1.

REMOTE SERVER 1504 is any computer system that serves at least some data and/or functionality to computer 1501, such as a destination node $400_D$. Remote server 1504 may be controlled and used by the same entity that operates computer 1501. Remote server 1504 represents the machine(s) that collect and store helpful and useful data for use by other computers, such as computer 1501. For example, in a hypothetical case where computer 1501 is designed and programmed to provide a recommendation based on historical data, then this historical data may be provided to computer 1501 from remote database 1530 of remote server 1504.

PUBLIC CLOUD 1505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1505 is performed by the computer hardware and/or software of cloud orchestration module 1541. The computing resources provided by public cloud 1505 are typically implemented by virtual computing environments that run on various computers making up the computers of host physical machine set 1542, which is the universe of physical computers in and/or available to public cloud 1505. The virtual computing environments (VCEs) typically take the form of virtual machines from virtual machine set 1543 and/or containers from container set 1544. It is understood that these VCEs may be stored as images and may be transferred among and between the various physical machine hosts, either as images or after instantiation of the VCE. Cloud orchestration module 1541 manages the transfer and storage of images, deploys new instantiations of VCEs and manages active instantiations of VCE deployments. Gateway 1540 is the collection of computer software, hardware, and firmware that allows public cloud 1505 to communicate through WAN 1502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1506 is similar to public cloud 1505, except that the computing resources are only available for use by a single enterprise. While private cloud 1506 is depicted as being in communication with WAN 1502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1505 and private cloud 1506 are both part of a larger hybrid cloud.

The letter designators, such as g, h, i, j, k, l, m, n, are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for allocating network resources to computational nodes in a network, the computer program product comprising a computer readable storage medium having computer readable program code embodied therein that when executed performs operations, the operations comprising:

allocating, by a slice manager, dedicated network elements to slices, defining sets of computational nodes, to provide dedicated paths in the network for the computational nodes in the slices to interconnect with other computational nodes in a same slice, wherein the computational nodes connect to leaf switches and the leaf switches connect to spine switches, wherein the spine switches interconnect the leaf switches, wherein the dedicated network elements comprise at least one of a switch, an edge of at least one link, a link, and at least one queue of a port for a link;

providing, by the slice manager, switch routing rules for the slices to the switches including the dedicated network elements, wherein a switch routing rule for a slice provided to a switch controls the switch to route packets between the computational nodes in the slice through the dedicated network elements in the slice;

receiving an indicated computational node to assign to an indicated slice of the slices;

determining a leaf switch that connects to the indicated computational node and to leaf switches in the indicated slice;

assigning a network element for an edge, between the leaf switch and the indicated computational node, to the indicated slice having an available capacity of the indicated computational node;

updating routing rules to route packets from the computational nodes in the indicated slice to network elements, including the assigned network element, assigned to the indicated slice; and propagating, by the slice manager, the updated routing rules to the determined leaf switch.

2. The computer program product of claim 1, wherein the allocating the dedicated network elements to the slices comprises:

determining edges in a subgraph connecting computational nodes in a specified slice, comprising one of the slices, through leaf and spine switches; and allocating links of the edges and queues of the edges to the computational nodes in the specified slice to satisfy a bandwidth demand of the computational nodes in the specified slice.

3. The computer program product of claim 2, wherein the allocating the links of the edges and the queues of the edges to the specified slice comprises:

selecting one of the determined edges;

determining whether the selected edge has sufficient available capacity in at least one link to allocate to the bandwidth demand of a specified computational node in the specified slice;

allocating at least one link of the selected edge to the specified slice in response to determining that the at least one link of the selected edge has sufficient available capacity for the bandwidth demand of the specified computational node in the specified slice; and allocating at least one queue for the at least one link of the selected edge to the specified slice in response to determining that the at least one link of the selected edge has sufficient available capacity.

4. The computer program product of claim 3, wherein the bandwidth demand of the computational node in the specified slice comprises a bandwidth at a port through which the computational node communicates to a leaf switch divided by an oversubscription ratio for the slice.

5. The computer program product of claim 3, wherein the operations further comprise:

reallocating capacity in the selected edge allocated to other slices, other than the specified slice, to the specified slice to satisfy the bandwidth demand of the computational node; and assigning a queue in the selected edge to the specified slice.

6. The computer program product of claim 2, wherein quality of service profiles include information:

mapping traffic classes to queues for the edges;

mapping ports of computational nodes to traffic classes, wherein computational nodes in one slice map to a same traffic class; and using a quality of service profile to map traffic from computational nodes to queues for the edges based on port information to which the computational nodes connect.

7. The computer program product of claim 6, wherein the operations further comprise:

determining whether a quality of service profile is provided for computational nodes, wherein a switch routing rule for a computational node not having a quality of service profile maps the computational node to at least one link, wherein the switch routing rules of computational nodes having quality of service profiles map the computational nodes to traffic classes provided for the quality of service profiles.

8. The computer program product of claim 1, wherein the routing rules map traffic of the computational nodes to traffic classes, wherein a switch routing rule causes the switch to perform operations, the operations comprising:

in response to receiving a packet from a source computational node destined for a target computational node, determining a switch routing rule mapping traffic of the source computational node to a traffic class;

indicating the traffic class, in the determined switch routing rule, in the received packet;

determining a queue in a port mapping to the traffic class included in the received packet;

adding the packet in the determined queue; and removing the indication of the traffic class from the packet when transmitting the packet to a remote switch to connect to a destination node.

9. The computer program product of claim 1, wherein at least one edge is comprised of two links from a leaf switch to one spine switch, wherein there are different sets of queues for the two links in an edge to allocate to slices.

10. A system for allocating network resources to computational nodes in a network, comprising:

a processor; and a computer readable storage medium having computer readable program code embodied therein that when executed by the processor performs operations, the operations allocating, by a slice manager, dedicated network elements to slices, defining sets of computational nodes, to provide dedicated paths in the network for the computational nodes in the slices to interconnect with other computational nodes in a same slice, wherein the computational nodes connect to leaf switches and the leaf switches connect to spine switches, wherein the spine switches interconnect the leaf switches, wherein the dedicated network elements comprise at least one of a switch, an edge of at least one link, a link, and at least one queue of a port for a link;

providing, by the slice manager, switch routing rules for the slices to the switches including the dedicated network elements, wherein a switch routing rule for a slice provided to a switch controls the switch to route packets between the computational nodes in the slice through the dedicated network elements in the slice;

receiving an indicated computational node to assign to an indicated slice of the slices;

determining a leaf switch that connects to the indicated computational node and to leaf switches in the indicated slice;

assigning a network element for an edge, between the leaf switch and the indicated computational node, to the indicated slice having an available capacity of the indicated computational node;

updating routing rules to route packets from the computational nodes in the indicated slice to network elements, including the assigned network element, assigned to the indicated slice; and propagating, by the slice manager, the updated routing rules to the determined leaf switch.

11. The system of claim 10, wherein the allocating the dedicated network elements to the slices comprises:

determining edges in a subgraph connecting computational nodes in a specified slice, comprising one of the slices, through leaf and spine switches; and allocating links of the edges and queues of the edges to the computational nodes in the specified slice to satisfy a bandwidth demand of the computational nodes in the specified slice.

12. The system of claim 11, wherein the allocating the links of the edges and the queues of the edges to the specified slice comprises:

selecting one of the determined edges;
determining whether the selected edge has sufficient available capacity in at least one link to allocate to the bandwidth demand of a specified computational node in the specified slice;
allocating at least one link of the selected edge to the specified slice in response to determining that the at least one link of the selected edge has sufficient available capacity for the bandwidth demand of the specified computational node in the specified slice; and
allocating at least one queue for the at least one link of the selected edge to the specified slice in response to determining that the at least one link of the selected edge has sufficient available capacity.

13. The system of claim 12, wherein the operations further comprise:
reallocating capacity in the selected edge allocated to other slices, other than the specified slice, to the specified slice to satisfy the bandwidth demand of the computational node; and
assigning a queue in the selected edge to the specified slice.

14. The system of claim 11, wherein quality of service profiles include information:
mapping traffic classes to queues for the edges;
mapping ports of computational nodes to traffic classes, wherein computational nodes in one slice map to a same traffic class; and
using a quality of service profile to map traffic from computational nodes to queues for the edges based on port information to which the computational nodes connect.

15. The system of claim 10, wherein the routing rules map traffic of the computational nodes to traffic classes, wherein a switch routing rule causes the switch to perform operations, the operations comprising:
in response to receiving a packet from a source computational node destined for a target computational node, determining a switch routing rule mapping traffic of the source computational node to a traffic class;
indicating the traffic class, in the determined switch routing rule, in the received packet;
determining a queue in a port mapping to the traffic class included in the received packet;
adding the packet in the determined queue; and
removing the indication of the traffic class from the packet when transmitting the packet to a remote switch to connect to a destination node.

16. A method for allocating network resources to computational nodes in a network, comprising:
allocating, by a slice manager, dedicated network elements to slices, defining sets of computational nodes, to provide dedicated paths in the network for the computational nodes in the slices to interconnect with other computational nodes in a same slice, wherein the computational nodes connect to leaf switches and the leaf switches connect to spine switches, wherein the spine switches interconnect the leaf switches, wherein the dedicated network elements comprise at least one of a switch, an edge of at least one link, a link, and at least one queue of a port for a link;
providing, by the slice manager, switch routing rules for the slices to the switches including the dedicated network elements, wherein a switch routing rule for a slice provided to a switch controls the switch to route packets between the computational nodes in the slice through the dedicated network elements in the slice;
receiving an indicated computational node to assign to an indicated slice of the slices;
determining a leaf switch that connects to the indicated computational node and to leaf switches in the indicated slice;
assigning a network element for an edge, between the leaf switch and the indicated computational node, to the indicated slice having an available capacity of the indicated computational node;
updating routing rules to route packets from the computational nodes in the indicated slice to network elements, including the assigned network element, assigned to the indicated slice; and
propagating, by the slice manager, the updated routing rules to the determined leaf switch.

17. The method of claim 16, wherein the allocating the dedicated network elements to the slices comprises:
determining edges in a subgraph connecting computational nodes in a specified slice, comprising one of the slices, through leaf and spine switches; and
allocating links of the edges and queues of the edges to the computational nodes in the specified slice to satisfy a bandwidth demand of the computational nodes in the specified slice.

18. The method of claim 17, wherein the allocating the links of the edges and the queues of the edges to the specified slice comprises:
selecting one of the determined edges;
determining whether the selected edge has sufficient available capacity in at least one link to allocate to the bandwidth demand of a specified computational node in the specified slice;
allocating at least one link of the selected edge to the specified slice in response to determining that the at least one link of the selected edge has sufficient available capacity for the bandwidth demand of the specified computational node in the specified slice; and
allocating at least one queue for the at least one link of the selected edge to the specified slice in response to determining that the at least one link of the selected edge has sufficient available capacity.

19. The method of claim 17, wherein quality of service profiles include information:
mapping traffic classes to queues for the edges;
mapping ports of computational nodes to traffic classes, wherein computational nodes in one slice map to a same traffic class; and
using a quality of service profile to map traffic from computational nodes to queues for the edges based on port information to which the computational nodes connect.

20. The method of claim 16, wherein the routing rules map traffic of the computational nodes to traffic classes, wherein a switch routing rule causes the switch to perform operations, further comprising:
in response to receiving a packet from a source computational node destined for a target computational node, determining a switch routing rule mapping traffic of the source computational node to a traffic class;
indicating the traffic class, in the determined switch routing rule, in the received packet;
determining a queue in a port mapping to the traffic class included in the received packet;
adding the packet in the determined queue; and removing the indication of the traffic class from the packet when transmitting the packet to a remote switch to connect to a destination node.

* * * * *